March 26, 1963   C. R. P. STONOR   3,083,358
DETECTING AND INDICATING APPARATUS, PARTICULARLY FOR FIRE
Filed Oct. 30, 1958   3 Sheets-Sheet 1
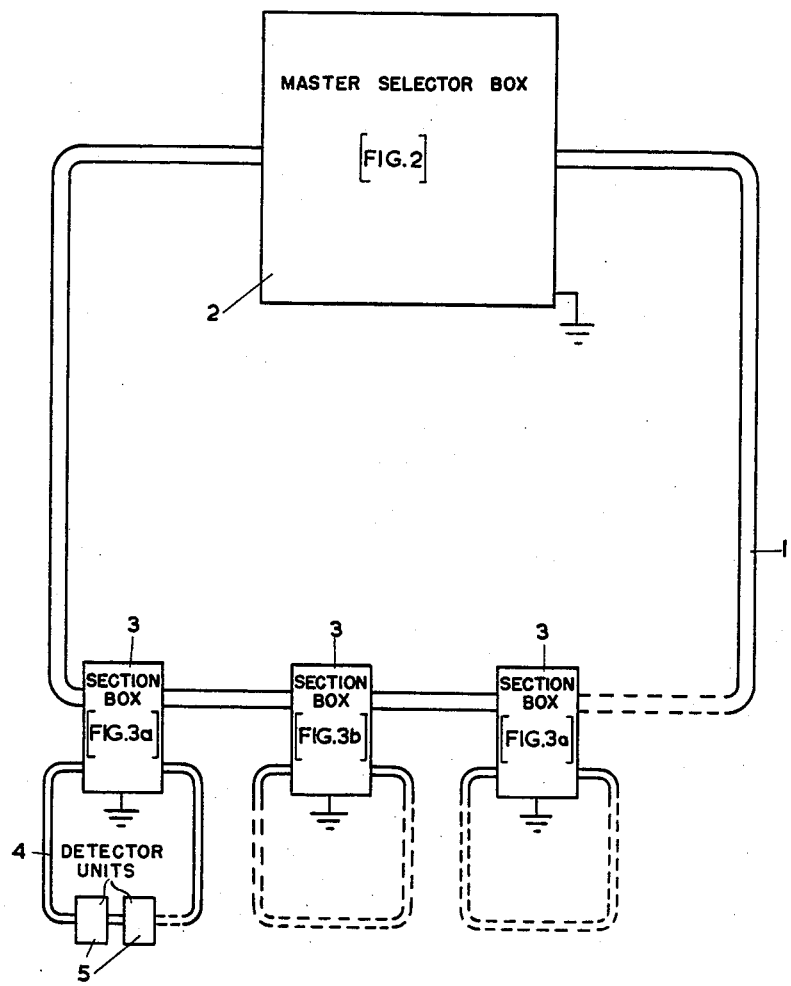
FIG. 1
FIG. 4
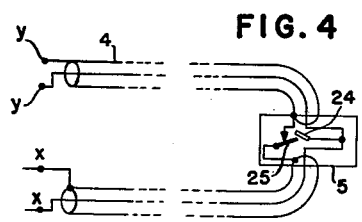
INVENTOR
CHARLES R. P. STONOR
Norris & Bateman
ATTORNEYS March 26, 1963 C. R. P. STONOR 3,083,358
DETECTING AND INDICATING APPARATUS, PARTICULARLY FOR FIRE
Filed Oct. 30, 1958 3 Sheets-Sheet 2

INVENTOR
Charles R. P. Stonor
Norris & Bateman
ATTORNEYS

United States Patent Office 3,083,358
Patented Mar. 26, 1963

3,083,358
DETECTING AND INDICATING APPARATUS,
PARTICULARLY FOR FIRE
Charles Richard Paul Stonor, Tylers Green, near Haywards, Heath, England, assignor to Sound Diffusion (Auto-Thermatic) Limited, Portslade, England
Filed Oct. 30, 1958, Ser. No. 770,701
5 Claims. (Cl. 340—227)

This invention relates to detecting and indicating apparatus and in particular to installations of fire detecting and indicating apparatus in major industrial and similar extensive premises.

In normal factories, sectionalisation of a fire detection system can be carried out relatively easily and with little cost. The building is divided into the requisite number of sections and the detectors on that section are interconnected and then wired back to the central control cabinet. On a constantly monitored system there are thus two cables per section running back to the central equipment.

For a large industrial site this arrangement, whilst still possible, is economically undesirable. The area which the entire system covers may extend over several acres and a very considerable number of sections may be required. To carry out an installation of this type in the manner just described would, obviously, be extremely expensive in terms of labour and installed cable. A simpler system is desirable, therefore, for such installations and, according to the invention, the alarm sectionalisation is achieved in a completely different manner achieving a marked saving in cable and labour costs without in any way detracting from the efficiency and reliability of a constantly monitored alarm system.

According to the invention, the individual detectors serving a given section are connected in a ring circuit which includes a section box and the section boxes of each section are themselves connected in a second ring circuit with a master selector box.

An embodiment of the invention will now be described with reference to the accompanying drawings of which:

FIG. 1 is a general block schematic diagram of a complete system,

FIGURE 4 is a circuit diagram of the fire detecting unit illustrated in FIGURE 1.

Figure 2:
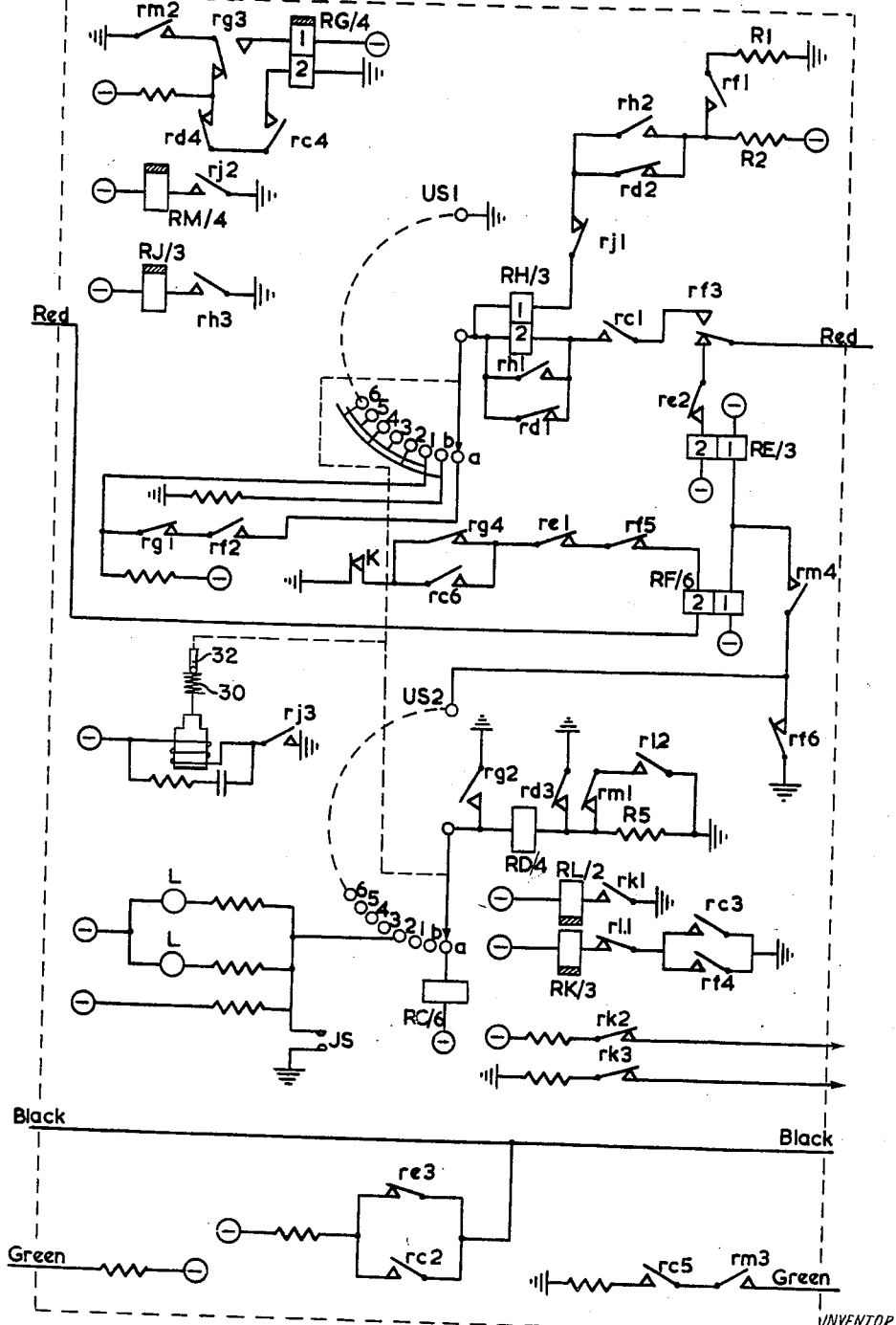
FIG. 2 is a circuit diagram of the master selector box at the central station.

Referring first to FIG. 1 the three core cable shown diagrammatically at 1 interconnects in a ring circuit the central master selector box 2 and the individual section boxes 3. Three of the latter are shown but more may and will be used in practice. From each section box extends a coaxial cable loop 4 interconnecting various individual detector units 5. These detector units may be of the kind described in British Patent Number 822,470, issued October 28, 1959, in which specification it is further explained that the coaxial cable itself may serve as a detector whereby an alarm is given if the cable is broken or short circuited. In said British patent an alarm was given at the section box itself and this may apply in the case of the present invention. However, in accordance with the invention, all the section boxes are also continuously monitored over the cable 1 and an alarm at an individual section box causes equipment in the master selector box to search for and identify the section box at which an alarm condition exists.

Figure 3A:
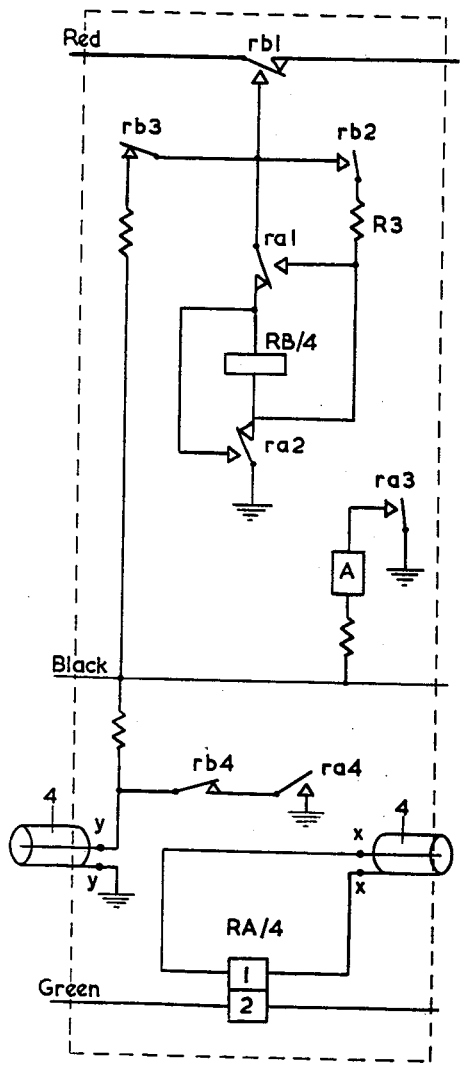
FIGS. 3a and 3b are circuit diagrams of alternate types of section box.
Figure 3B:
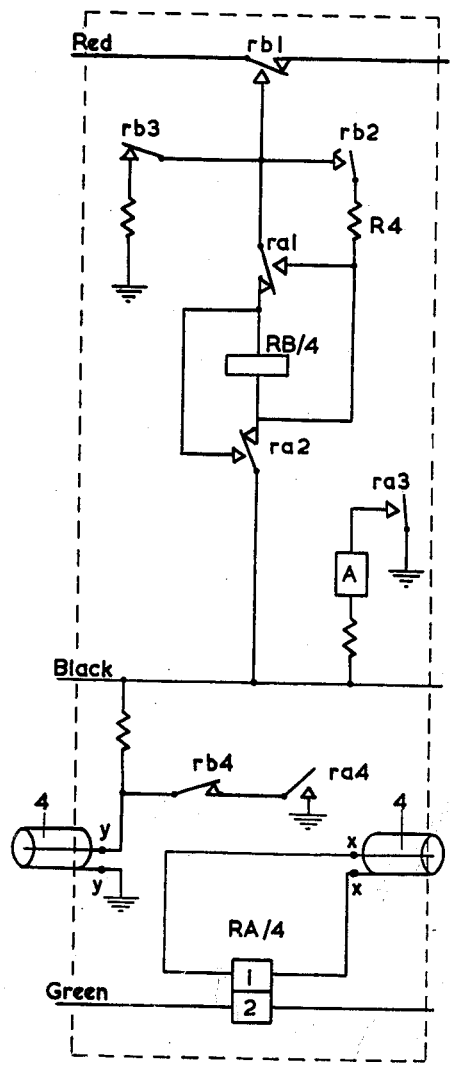

The remainder of the description will be mainly concerned with the circuit diagram of FIGS. 2, 3a and 3b and it is to be noted that, in order to facilitate understanding of the description of operation, all relays have been shown with their contacts in the positions which they take up in the normal or ready condition of the equipment.

The master selector box shown in FIG. 2 makes use of a uniselector switch of conventional telephone type employing two banks of wiper contacts US1 and US2. As shown and described, this uniselector is of the reverse-acting type wherein the driving magnet DM, when energised, tensions a spring 30 which performs the stepping through linkage 32 when the magnet is de-energised.

The two types of section box shown in FIGS. 3a and 3b respectively are similar in function and differ only in minor detail for reasons which will be apparent as the description proceeds. As shown in FIG. 1 the two types of section box are connected alternately in the ring circuit formed by the cable 1. The three cores of this cable will be designated red, black and green for convenience.

Those parts of the circuit which have not yet been specifically referred to will be introduced as and when they take part in the operation of the system as a whole.

*Normal Condition—Section Box (FIG. 3a or 3b)*

Winding 1 of the RA relay in each section box is energised by current flowing from the black line through the coaxial loop circuit 4 to earth. As described in British Patent No. 822,470, coaxial loop circuit 4 is a coaxial type cable in which one conductor is enclosed with the other conductor and spaced therefrom by an insulating medium adapted to melt at a comparatively low temperature so that in the event of fire attacking the cable, the insulating medium becomes fluid and the inner conductor sags to make contact with the outer conductor, thereby changing the circuit conditions and causing the alarm to be given.

Referring now to FIGURE 4, detector apparatus 5 is the same as that described in said British patent and comprises a bimetallic element 24 connected to inner conductor of cable 4 and a contact 25 connected in series with the outer conductor of cable 4. If fire breaks out near detector 5, bimetallic element 24 operates first to short circuit winding 1 of relay RA. Further movement of bimetallic element 24 opens contact 25 to remove the short circuit but to keep winding 1 of relay RA de-energised by breaking one leg of the circuit thereto.

If flames attack coaxial cable 4, the insulator (polyethene) becomes fluid and the inner conductor sags to make contact with the other conductor. This action short circuits winding 1 relay RA and thereby de-energises winding 1 of relay RA.

The RB relays in each section box are also energised by current flowing from the black line to earth.

*Normal Condition—Master Selector Box*

The uniselector has its wiper on the first or home contact *a* in each bank and current flows through relays RC and RD via the home contact *a* in bank US2. This current is sufficient to energise RC but not RD. The second windings of relays RE and RF are energised in series through the red line and the *rb*1 contacts in each section box. The red line is thus monitored by the holding current of the RE and RF relays.

*Alarm—Section Box*

When relay RA is de-energised by short circuiting or open circuiting coaxial cable 4, contacts *ra*3 close to operate an alarm A in the corresponding section box. Contacts *ra*1 and *ra*2 reverse the connections of relay RB and contact *rb*3 opens to lock out this relay against immediate re-operation. Contact *rb*1 opens to interrupt the current flowing through the red line. It will be assumed that the section box on which an alarm originates is the second box on the ring, of the type shown in FIG. 3b.

Alarm—Master Selector Box

The breaking of the red line de-energises relays RE and RF. These two relays are interconnected in such a way that if only one releases, a contact will open the circuit and release the other. For example, RE will be released by the opening of rf3 and RF by re1. In addition both relays lock out by contacts re2 and rf5 against operation over their second windings for the time being. The monitoring relays RE and RF are provided in duplicate to ensure that an alarm indication will be given should the red line become accidentally earthed or come into contact with an extraneous voltage. It will be seen that earthing the red line will de-energise RF as also will the presence of a positive voltage. A negative voltage on the red line will cause RE to release. As previously explained the net result will in each case be the release of both relays.

Contact re3 opens to disconnect current from the black line and thus causes all the RA and RB relays in the remaining section boxes to release.

Contact rf1 completes the circuit of a low resistance potential divider comprising two resistors R1 and R2 across the battery supply. The centre point of these resistors thus becomes an equi-potential point when referred to either full earth or to negative. Consequently, with rf2 closed, current can flow through the home contact a on bank US1 of the uniselector to energise the first winding of relay RH. The second winding circuit is, however, held open by contact rc1 of the still operated relay RC. Contact rf4 completes the operating circuit for relay RK which closes contact rk1 and energises relay RL. The latter opens rl1 and disconnects RK. The two relays then operate alternately and the corresponding movements of contacts rk1 and rk2 cause a distant alarm relay (not shown) to pulse, so repeating the alarm, for example, at the fire station.

Contact rh3 of relay RH completes the circuit to energise relay RJ. The closing of contact rj3 energises the driving magnet DM of the uniselector but since the latter is of the reverse-acting type, no stepping takes place. Contact rj1 opens to release relay RH (winding 1) and rj2 closes to energise relay RM.

As rh3 opens, the slugged relay RJ releases slowly. On its ultimate release, the driving magnet DM of the uniselector is de-energised by the opening of rj3 and the wiper steps to the second contact b in each bank. The closing of rj1 recompletes the circuit for RH to operate.

From the foregoing, it is clear that if detector 5 for the section box 3 of FIGURE 3b detects a fire condition, bimetallic element 24 is operated by the heat of the fire to de-energize relay RA. This action closes contact ra3 to sound alarm A at the section box of FIGURE 3b and also locks out relay RB against immediate operation. By de-energisation of relay RB, contact rb1 is opened to interrupt the current flow through the red line.

Through the operation of relays RE, RF and RH, relay RJ cycles as hereinbefore described to energise the drive magnet DM to tension spring and then to de-energise magnet DM to allow the energy stored in spring 30 to accomplish the stepping operation of the selector wipers from one contact to the other in each of the banks.

The stepping of the wiper onto the second contact b in the bank US2 causes the release of relay RC. Contact rc2 recompletes the circuit of the black line to cause all the RA relays in the section boxes to be operated with the exception of the one on which the alarm originated. This cannot be re-operated because its operating circuit depends on the broken or short-circuited co-axial loop.

Contact rc5 completes the circuit for the green line in the main ring (RM, being a slugged relay, retains contact rm3 closed). This supplies a holding but not an operating current to the second windings of all the RA relays. Thus, these relays all remain energised except the one in the section box which received the alarm.

Thus even if a second section box receives an alarm during the first cycle of investigation, the cycle is completed correctly.

As the uniselector wiper steps to contact b of bank US1, it connects earth to one side of winding 1 of relay RH and since the other side is connected to the mid point of the potential divider, this relay is energised. Winding 2 of RH is short-circuited by contact rd1. Both the RB coil in the first box (FIG. 3a) and the second contact b of the first bank of the uniselector are connected to earth so that this RB coil cannot be affected.

When relay RH is energised it causes the uniselector wiper to step from the second contact b to the third contact, the cycle of the operating relays being the same as in the first stepping. This third contact on the uniselector banks has been numbered 1 since it corresponds to the first section box and the remaining contacts of the banks have been numbered consecutively. Each of the contacts in bank US2 corresponding to a section box has associated with it a respective indicator circuit comprising a pair of lamps L connected as shown in association with contact 2 of this bank. Only one such indicator circuit has been shown for the sake of simplicity. Two lamps in parallel are employed to allow for the failure of one of them.

As the uniselector steps to contact 1, relay RD operates in series with the indicator lamps corresponding to section 1. The latter are illuminated for such a short interval of time that this is not visible on the panel of the master selector box. Contact rd2 opens to disconnect winding 1 of the relay RH while rd1 opens to remove the short circuit across winding 2 and thus effectively connect the relay into the red line. Negative is thus connected over contact 1 in bank US1 through winding 2 of relay RH, contacts rc1, rf3 (FIG. 2) and contacts rb1 and ra1 (FIG. 3a) to the coil of relay RB in the first section box. The return circuit of this relay is to earth via contact ra2 whilst contact rb2 in the unoperated condition connects a low resistance R3 across the high resistance winding of relay RB. The presence of this resistance across the latter enables the relay RB to operate, also relay RH (second winding).

When relay RB operates it holds to negative via rb3, the black line and rc2. Contact rb1 is arranged to act after rb3 and when it changes over it switches the red line through to the next box (FIG. 3b) on which it has been assumed that an alarm has been given.

Contact rh2 holds RH operated via winding 1 while rh1 short-circuits the winding 2. Contact rh3 causes RJ to operate and energise the uniselector driving magnet DM via contact rj3. Contact rj1 breaks the holding circuit (winding 1) for RH which releases. Contact rh3 opens to cause the release of RJ resulting in the stepping of the uniselector to contact 2. This has resulted in the first section box being returned to its normal state as shown in FIG. 3a.

Thus it will be appreciated that the stepping of the wipers is dependent upon the operation relay RH which causes relay RJ to cycle and thereby activate spring 30 through the energization of drive magnet DM.

As the uniselector steps to contact 2, earth is connected via the red line to the RB relay in the second box (FIG. 3b). Since it has been assumed that an alarm condition exists at this box, the RA relay therein is released so that the corresponding low resistance R4 is short circuited by contacts ra1 and rb2. Winding 2 of RH is thus connected to negative via the high resistance of the unshunted coil of the relay RB. The current flowing through the two relays is sufficient to operate RB but not RH. RB is held operated from the black line over the local contacts ra2, ra1 and rb3 to earth. The changing over of rb1 switches the red line through to box No. 3 but this has no effect on RH as the return connection of the RB coil in this box is to earth.

As relay RH is unable to operate when it is connected through to a section box at which an alarm condition exists, the uniselector is unable to step further and the slugged relay RM, which had remained operated over the pulsing of relay RJ, releases. Thus, from the foregoing the operation of the system is clear. To this end, assume, for example, that a fire condition develops in the zone protected by the fire detecting unit or section box 3 of FIGURE 3b. The heat created by the fire condition operates the bimetallic element 24 as previously described to de-energize relay RA. With this action, contacts ra1, ra2, ra3 and ra4 are released to positions opposite to that shown in FIGURE 3b and relay RB is de-energized. When relay RB is de-energized, contacts rb1, rb2, rb3 and rb4 are released to positions opposite to that shown in FIGURE 3b. By releasing contacts rb1 of FIGURE 3b to a circuit opening position, current flow through the red line, which forms a loop circuit with the current supply source, is interrupted. As a result of interrupting current flow through the red line, relay RE is de-energized to release contacts re3.

The release of contacts re3 disconnects current from the black line to thereby temporarily de-energize all of the remaining relays RA in the remaining ones of section boxes 3 illustrated in FIGURE 3a. By de-energizing the remaining relays RA the associated relays RB are also de-energized to release contacts rb1–4.

Thus, all of the contacts rb1 in each of the section boxes are released to circuit opening position. This action conditions the system for the scanning operation to be performed by the stepping switch mechanism designated at US1. To this end, it is clear that by releasing all of the contacts rb1 in the section boxes 3 to assume circuit interrupting positions opposite to that illustrated in FIGURES 3a and 3b, the relays RB of all the section boxes 3 are connected to the red line. Before the scanning operation actually begins, all of the relays RA are re-energized except the relay RA at the section box where the fire condition was sensed in the manner previously explained. Thus, the circuit for re-energizing relay RB in FIGURE 3b from the red line is altered in comparison to the re-energizing circuits in the remaining section boxes 3. That is, contacts ra1 and ra2 at FIGURE 3b are released to positions opposite to that shown and contacts ra1 and ra2 shown in FIGURE 3a have re-assumed the positions shown.

When the wiper of US1 is now advanced to contact 1 in bank US1, a scanning current will flow through relay RB in the first section box 3 illustrated in FIGURE 3. Since there is no fire condition present at the first section box 3 illustrated in FIGURE 3a, a part of this scanning current is shunted around relay RB. The by-passing of scanning current through R3 energizes winding 2 of stepper relay coil RH with sufficient energy to advance the stepping switch wiper to contact 2 in bank US1. At the same time, relay RB in the first section box 3 of FIGURE 3a is re-energized and establishes its own holding circuit.

With the re-energization of relay RB in the first section box 3 where no fire condition was sensed, contact rb1 is actuated thereby resuming the position illustrated in FIGURE 3a, thus completing the red line circuit to the second section box 3 of FIGURE 3b where the fire condition was sensed. Since contacts rb1 in FIGURE 3b are still released, a circuit is completed to re-energize relay RB at the section box 3 of FIGURE 3b.

Due to the sensing of a fire and the consequent release of contacts ra1 and ra2, substantially all of the scanning current flows through relay RB and no current is by-passed through R4. As a result, relay RB is re-energized but the current magnitude is inadequate to energize stepper relay RH sufficiently to advance the wiper of US1 as previously described. Thus, the wiper of US1 is arrested at contact 2 of US1, thereby indicating in itself the presence of a fire condition at the second section box 3 of FIGURE 3b.

As the uniselector which had been stepping at the rate of approximately ten steps per second stopped, the section box indicator lamps L on the master selector box panel were illuminated over contact 2 in the bank US2 to indicate that an alarm condition exists at section box 2. These lamps are the only ones which have been shown in FIG. 2. As already explained the interconnected relays RK and RL are pulsing all this time so opening and closing the contact rl2. This causes the illuminated lamps L to dim and brighten in a regular sequence as the dimming resistance R5 is alternately cut in and out of the circuit.

The master selector box of FIG. 2 stays in this condition until a marker jack is inserted in the jack socket JS adjacent to the illuminated lamps to earth contact 2 on bank US2 of the uniselector. The lamps L then brighten and stay bright and relay RD, being short-circuited, releases.

The closing of rd4 causes relay RG to operate via its second winding and contact rc4. Contact rg2 puts full earth on the wiper of bank US2 so short-circuiting relay RD. The closing of rd2 causes relay RH to operate via its first winding.

By interaction of relays RH and RJ the uniselector is stepped onto contact 3. Contact rd1 having short-circuited the line winding 2 of relay RH, the stepping of the uniselector is made dependent on the local operating circuit through winding 1 and contacts rd1 and rj2. Relays RH and RJ interact and the uniselector continues to step, continually reversing the polarity of the voltage applied to the red line via the contacts of bank US1. This voltage applied via contacts rd1, rc1 and rf3 to the red line causes all the remaining RB relays in the section boxes to operate in sequence. These relays hold either to earth or the black line over the respective rb3 contacts.

Relay RM, being slugged, remains operated over the pulsing of relay RJ and by its contact rm2 provides an alternative holding circuit for the first winding of relay RG through its contact rg3.

As the uniselector steps to the last contact on the banks, relays RF and RE are operated via their first windings over the contact rm4 from the last contact of bank US2 which in turn is earthed via contact rg2. Contact rf6 closes to provide a holding circuit for the first windings of these two relays, a holding circuit for the second windings being already completed through the red line.

The last contact of bank US1 supplies an earth to the first winding of relay RH which is connected to negative via contacts rj1 and rd2. By interaction between relays RJ and RH the uniselector steps to contact a. This causes relay RC to be operated via bank US2 and contact rg2. Contact rc4 opens to disconnect the second winding of relay RG whilst rc6 breaks the red line holding for the second windings of relays RE and RF. The latter are however held on by their first windings energised through contacts rm4 and rf6.

Since contact rg1 is open, relay RH cannot operate to cause the uniselector to step off its first contact a. After a short delay, the slugged relay RM releases and its contact rm2 disconnects the first winding of relay RG whilst contact rm4 disconnects the first winding of relays RE and RF. Relay RG is also slugged to release slowly and, due to the time difference between the opening of contact rm4 and the closing of rg4, relays RE and RF again release.

Contact re3 opens the black line allowing all the RA and RB relays to release whilst contacts rg1 and rf2 restore a negative connection over the contact a of uniselector bank US1 to relay RH. By interaction of relays RH and RJ, the uniselector steps off contact a, and relay RC releases. Its contact rc5 connects earth via contact rm3 to the green line and its contact rc2 reconnects negative to the black line.

Two possibilities now exist. If during the previous cycle a second alarm was given at another section box, it must be detected and indicated by the master selector box. If not, the equipment must return to normal. The second cycle therefore constitutes a check on the previously given indication.

By interaction of relays RH and RJ, the uniselector steps to its contact 1 representing the first section box. Relay RD operates and by opening its contact rd1, reinserts winding 2 of relay RH in the red line. As the uniselector continues to step it reaches the contact at which the previous alarm is registered and, as before, the corresponding RB relay will operate but not relay RH. At this point, the relay RD will be released by virtue of the earth on bank US2 placed there by the jack marking the previous alarm. This causes the contact rd2 to complete a local operating circuit for relay RH through its first winding and contacts rj1 and rd2. The uniselector is thus enabled to step past this marked outlet. Since relay RM, being slugged, remained operated, relay RG is unable to operate on the release of relay RD by virtue of the fact that the second coil of relay RG is short-circuited to earth via contacts rm2, rg3, rd4 and rc4.

If an additional alarm is located the relay RM will release resulting in the operation of relay RG which will be connected to negative via contacts rc4 and rd4. Under this condition a second check cycle will be started when the uniselector returns to its contact a.

In the absence of such an additional alarm, relay RM is unable to release and the uniselector steps on, sequentially re-operating all the RB relays in the section boxes. As the uniselector steps to the last contact in each bank, relays RE and RF are re-operated over contact rm4 and hold via contact rf6 on their first windings and the completed red line on their second windings. Relay RH operates by its local coil 1 and causes the uniselector to step to its contact a. At this point relay RC operates but relays RF and RE remain holding over their second windings, contacts re2, rf3, all the rb1 contacts in the red line, rf5, the released contact rg4 and the key K. The slugged relay RM releases and at contact rm4 disconnects the first windings of relays RE and RF.

The equipment is thus restored to its normal condition as shown in the drawings.

After the alarm contact that released the RA relay in the section box concerned has been reset, the corresponding RA relay may be re-operated by starting a check cycle manually at the master selector box. This is achieved by opening the key K to break the holding circuit of the RE and RF relays. As contact re3 opens, all the RB relays are released and the short-circuiting contact rb4 on the previously operated section box is opened. This allows the RA relay in that box to operate and hold via the black line when the latter is re-completed by the closure of contact rc2. The equipment completes one cycle and returns to normal.

The marker jack plug can, of course, be removed from the front panel when the visual indication of the lamps is no longer required.

I claim:

1. In an automatic fire detecting and indicating system for protecting a number of zones in an area, a loop circuit passing through said zones, a fire detecting unit at each of said zones for sensing the presence of a fire condition with each fire detecting unit having fire detecting circuit means subject to predetermined alteration in response to the sensing of a fire condition and normally being disconnected from said loop circuit in absence of a fire condition at any of said zones, means for connecting the fire detecting circuit means of each fire detecting unit to said loop circuit in response to the sensing of a fire condition by any of said units, and means including scanning means in said loop circuit for successively scanning the condition of each fire detecting circuit means when connected to said loop circuit and for indicating the fire detecting unit having the fire detecting circuit means altered by the sensing of a fire condition at its associated zone.

2. In a fire detecting and indicating system for protecting a number of zones in an area, a loop circuit, a plurality of switching devices serially disposed in said loop circuit and being located one at each of said zones, said switching devices normally being in closed circuit making positions in absence of a fire condition at any of said zones, means including a fire detecting unit at each of said zones for opening all of said switching devices in response to a fire condition at any of said zones with each fire detecting unit having fire detecting circuit means subject to a predetermined current modifying alteration in response to a fire condition at its associated zone, said fire detecting circuit means of each of said fire detecting units being connected to said loop circuit by actuation of the switching device associated therewith to open position, a source of current connected to said loop circuit for transmitting a scanning current through each of said fire detecting circuit means when the switching device associated therewith is in open position and any preceding ones of said switching devices are in closed position, and switch closing means including a scanning means for successively closing each of said switching devices upon flow of scanning current through the fire detecting circuit means associated therewith, said scanning means being responsive to the modification of scanning current flowing through a fire detecting circuit means altered by the presence of a fire condition to indicate the unit sensing said fire condition.

3. In a fire detecting and indicating system for protecting a number of zones in an area, a loop circuit, a plurality of normally closed circuit making switches serially disposed in said loop circuit and being located one at each of said zones, at least one fire detecting unit associated with each of said switches at each zone for sensing the presence of a fire condition and including fire detecting circuit means subject to current modifying alteration in response to a fire condition to open the switch associated therewith to electrically interrupt said loop circuit, means responsive to the interruption of said loop circuit to open the remaining ones of said switches, said switches being operable when actuated to open positions to connect the fire detecting circuit means associated therewith to said loop circuit, a source of current connected to said loop circuit for transmitting a scanning current through each of said fire detecting circuit means when the switch associated therewith is in open position and any preceding ones of said switches are closed, and switch closing means including a scanning means for successively closing each of said switches upon flow of scanning current through the fire detecting circuit means associated therewith, said scanning means being responsive to the modification of scanning current flowing through a fire detecting circuit means altered by the presence of a fire condition to indicate the zone at which the altered fire detecting circuit means is located.

4. The fire detecting and indicating system defined in claim 3 wherein said scanning means comprises a stepping switch mechanism having an actuating coil means connected in said loop circuit for energization by said scanning current and a wiper element advanceable by normal energization of said coil means with scanning current unmodified by said fire detecting circuit means, said actuating coil means being inoperative to advance said wiper element when energized by scanning current modified by an altered one of said fire detecting circuit means.

5. The fire detecting and indicating system defined in claim 4 wherein said fire detecting circuit means comprises a relay controlling the actuation of the switch associated therewith and being normally energized in absence of a fire condition at its associated zone to retain the switch associated therewith in closed position, means for de-energizing said relay in response to the sensing of a fire condition to permit the switch associated therewith to open with said scanning current being operable to re-energize said relay, by-pass circuit means normally shunting current across said relay in absence of a fire condition when said relay is de-energized to enable a predetermined magnitude of scanning current to by-pass said relay for energizing said coil sufficiently to advance said wiper element, and means responsive to the sensing of a fire condition to prevent the shunting of scanning current through said by-pass circuit and to cause substantially all of said scanning current to flow through said relay thereby establishing said modified current.

References Cited in the file of this patent

UNITED STATES PATENTS

| | | |
|---|---|---|
| 1,058,725 | Cole | Apr. 15, 1913 |
| 2,410,814 | Evans | Nov. 12, 1946 |
| 2,736,012 | Bland | Feb. 21, 1956 |
| 2,847,662 | Lindgren | Aug. 12, 1958 |
| 2,867,793 | Bland | Jan. 6, 1959 |
| 2,870,434 | Schulze | Jan. 20, 1959 |
| 2,944,251 | Tetherow | July 5, 1960 |

FOREIGN PATENTS

| | | |
|---|---|---|
| 822,470 | Great Britain | Oct. 28, 1959 |